US012207155B1

(12) United States Patent
Allen

(10) Patent No.: US 12,207,155 B1
(45) Date of Patent: Jan. 21, 2025

(54) LOCKDOWN CAPABILITIES IN SUPPORT OF EMERGENCY SERVICES CALL LOCATION DATA

(71) Applicant: 91 1Inform LLC, Wall Township, NJ (US)

(72) Inventor: Ivo W. Allen, Freehold, NJ (US)

(73) Assignee: 911Inform LLC, Wall Township, NJ (US)

( * ) Notice: Subject to any disclaimer, the term of this patent is extended or adjusted under 35 U.S.C. 154(b) by 0 days.

(21) Appl. No.: 18/788,317

(22) Filed: Jul. 30, 2024

Related U.S. Application Data

(60) Provisional application No. 63/574,162, filed on Apr. 3, 2024.

(51) Int. Cl.
*H04W 4/00* (2018.01)
*H04W 4/02* (2018.01)
*H04W 4/16* (2009.01)
*H04W 4/90* (2018.01)

(52) U.S. Cl.
CPC ............ *H04W 4/023* (2013.01); *H04W 4/16* (2013.01); *H04W 4/90* (2018.02)

(58) Field of Classification Search
CPC .......... H04W 4/023; H04W 4/16; H04W 4/90
See application file for complete search history.

(56) References Cited

U.S. PATENT DOCUMENTS 11,900,778 B1 * 2/2024 Scully, Jr ............ G08B 25/006
2015/0339913 A1 * 11/2015 Lyman .................... G09B 5/04
340/287

* cited by examiner

*Primary Examiner* — Erika A Washington
(74) *Attorney, Agent, or Firm* — Morse, Barnes-Brown & Pendleton, P.C.; Sean D. Detweiler, Esq.

(57) ABSTRACT

A system and method for providing lockdown capabilities in conjunction with emergency call location data. The system includes a server that identifies and stores information detailing lockdown features associated with various location sites. Upon receiving a request for geospatial physical location data for an emergency caller during an active emergency call, the server compares the geospatial physical location of the caller with that of the location sites. If the caller's location overlaps with a site having lockdown capabilities, the system generates a notification describing the lockdown features of the relevant location site to the caller. This innovative system enhances emergency response efforts by providing critical information to individuals in need during emergency situations.

23 Claims, 9 Drawing Sheets

LOCKDOWN CAPABILITIES IN SUPPORT OF EMERGENCY SERVICES CALL LOCATION DATA

CROSS-REFERENCE TO RELATED APPLICATION(S)

This application claims priority to, and the benefit of, U.S. Provisional Application 63/574,162, filed Apr. 3, 2024, for all subject matter common to both applications. The disclosure of said provisional application is hereby incorporated by reference in its entirety.

FIELD OF THE INVENTION

The present invention relates to methods and systems for providing enhanced location data for emergency services calls, such as 911 calls in North America. In particular, the present invention is directed to providing lockdown capabilities in support of location data for emergency services calls.

BACKGROUND

The current system for providing emergency services caller information is limited. E911 (Enhanced 911) is the 911 network functionality available today in North America with equivalent services in other countries. E911 provides two basic lines of location information to the public safety answering point (PSAP), which is a call center where emergency calls (like police, fire brigade, and ambulance) are initiated by any mobile or landline subscriber are received. The PSAP is shown in the example data screen 100 of FIG. 1. The first is Line 1 data 102 and consists of the basic address associated with the specific phone number. The secondary Line 2 information 104 is the data a first responder can use to identify a specific location beyond the basic address, allowing them to locate the emergency. Line 2 data 104 is limited to 20 ASCII characters of information and is the information that can be updated to provide additional information. In many cases, these updates can take anywhere from 24-48 hours to go live in the PSAP.

In many emergency call situations, it is beneficial for the first responders, to have as much information about the location of the emergency call as possible. If the location of the emergency call is a site, the first responder would benefit from having a floor plan and room designation for the call. With a conventional system, the first responder must make additional inquiries or arrangements outside of the information provided as part of the emergency call response. For example, to gather all the information about the location, the first responders have to get in contact with the building owner or municipality to obtain lock-down capabilities and floor plans of the building. This can cause increased delays and present unnecessary danger for victims and first responders while waiting for lock-down capabilities and maps or floorplans or proceeding without the information.

The inefficiency of emergency call-handling technology to provide complete and useful location information, and account for the increased amount of available lock-down protocols, presents a problem for first responders responding to an emergency call. Increased delays and unnecessary danger for victims and first responders can result from waiting for additional location information, such as lock-down protocols, or can result in the first responders proceeding without the additional information and entering potentially dangerous situations or environments blind.

SUMMARY

There is a need for a technological improvement in the form of a system and method that is capable of providing accurate and useful geospatial physical location information for emergency call first responders including providing lockdown capabilities for the location of the emergency call during the emergency call. The present invention is directed toward further solutions to address this need, in addition to having other desirable characteristics. Specifically, the system and method of the present invention provide a technological solution for establishing what the lockdown capabilities are for a geospatial physical location of the location of an emergency call. The solution further enables remote activation of lockdown protocols in response to a location information inquiry for an emergency call. The present technological advance provides interactive features that can be presented and continuously updated in real-time that provide location data (including floorplans), lockdown capabilities at the site of the location, and remote activation of the lock-down capabilities if available.

In accordance with embodiments of the present invention, a system for providing lockdown capabilities in support of emergency call location data is presented. The system comprises a server configured to: identify and store information describing lockdown capabilities associated with one or more location sites; receive a request for geospatial physical location data for an emergency caller from an emergency call routing service based on an active emergency call; and during the emergency call: compare a geospatial physical location of the one or more location sites with the geospatial physical location data for the emergency caller; and when the geospatial physical location of the emergency caller positionally overlaps with the geospatial physical location of one of the one or more locations sites having identified and/or stored lockdown capabilities, provide an emergency responder at the one of the one or more location sites a notification that describes the lockdown capabilities of the one of the one or more location sites along with the geospatial physical location data of the caller.

In accordance with aspects of the present invention, the provided lockdown capabilities include lockdown protocols for the one or more location sites.

In accordance with aspects of the present invention, the provided lockdown capabilities include remote activation for lockdown at the location of the caller.

In accordance with aspects of the present invention, the one or more location sites comprise a building or grounds.

In accordance with aspects of the present invention, providing the geospatial physical location of the caller further includes providing a map of the geospatial physical location. In some such aspects, the lockdown capabilities are provided as selectable icons or links on the map.

In accordance with aspects of the present invention, providing the geospatial physical location of the caller further comprises providing an altitude of the caller.

In accordance with aspects of the present invention, providing the geospatial physical location of the caller further comprises providing a room within a building or facility the caller is located.

In accordance with aspects of the present invention, the server is further configured to register one or more geospatial physical location sites.

In accordance with aspects of the present invention, the server is further configured to provide a notification that describes the lockdown capabilities of the one of the one or more location sites along with the geospatial physical location data of the caller to an administrator.

In accordance with aspects of the present invention, the notification is provided in response to a query from the emergency responder.

In accordance with embodiments of the present invention, a system for providing lockdown capabilities in support of emergency call location data is presented. The system comprises an emergency call routing service configured to receive, process, and route emergency call and an enhanced geospatial physical location service provider in communication with the emergency call routing service. The enhanced geospatial physical location service provider configured to: identify and store information describing lockdown capabilities associated with one or more location sites, receive a request for geospatial physical location data for an emergency caller based on an active emergency call, and during the emergency call: compare a geospatial physical location of the one or more location sites with the geospatial physical location data for the emergency caller and when the geospatial physical location of the emergency caller positionally overlaps with the geospatial physical location of one of the one or more locations sites having identified and stored lockdown capabilities, provide an emergency responder at the one of the one or more location sites a notification that describes the lockdown capabilities of one of the one or more location sites along with the geospatial physical location data of the caller.

In accordance with embodiments of the present invention, a method for providing lockdown capabilities in support of emergency call location data is presented. The method comprises identifying and storing information describing lockdown capabilities associated with one or more location sites, receiving a request for geospatial physical location data for an emergency caller based on an active emergency call, and during the emergency call: comparing a geospatial physical location of the one or more location sites with the geospatial physical location data for the emergency caller and when the geospatial physical location of the emergency caller positionally overlaps with the geospatial physical location of one of the one or more locations sites having identified and stored lockdown capabilities, providing an emergency responder at the one of the one or more location sites a notification that describes the lockdown capabilities of the one of the one or more location sites along with the geospatial physical location of the caller.

In accordance with aspects of the present invention, the provided lockdown capabilities include lockdown protocols for the one or more location sites.

In accordance with aspects of the present invention, the provided lockdown capabilities include remote activation for lockdown at the location of the caller.

In accordance with aspects of the present invention, the one or more location sites comprise a building or grounds.

In accordance with aspects of the present invention, providing the geospatial physical location of the caller further includes providing a map of the geospatial physical location. In certain aspects, the lockdown capabilities are provided as selectable icons or links on the map.

In accordance with aspects of the present invention, providing the geospatial physical location of the caller further comprises providing an altitude of the caller.

In accordance with aspects of the present invention, the providing the geospatial physical location of the caller further comprises providing a room within a building or facility the caller is located.

In accordance with aspects of the present invention, the method further includes registering one or more geospatial physical location sites.

In accordance with aspects of the present invention, the method further includes providing a notification that describes the lockdown capabilities of the one of the one or more location sites along with the geospatial physical location data of the caller to an administrator.

In accordance with aspects of the present invention, the notification is provided in response to a query from the emergency responder.

BRIEF DESCRIPTION OF THE FIGURES

These and other characteristics of the present invention will be more fully understood by reference to the following detailed description in conjunction with the attached drawings, in which:

FIG. 5 is an example screenshot of location data that can be stored in the location database when a site location is registered with the enhanced location service provider in accordance with embodiments of the present invention;

DETAILED DESCRIPTION

Figure 1:
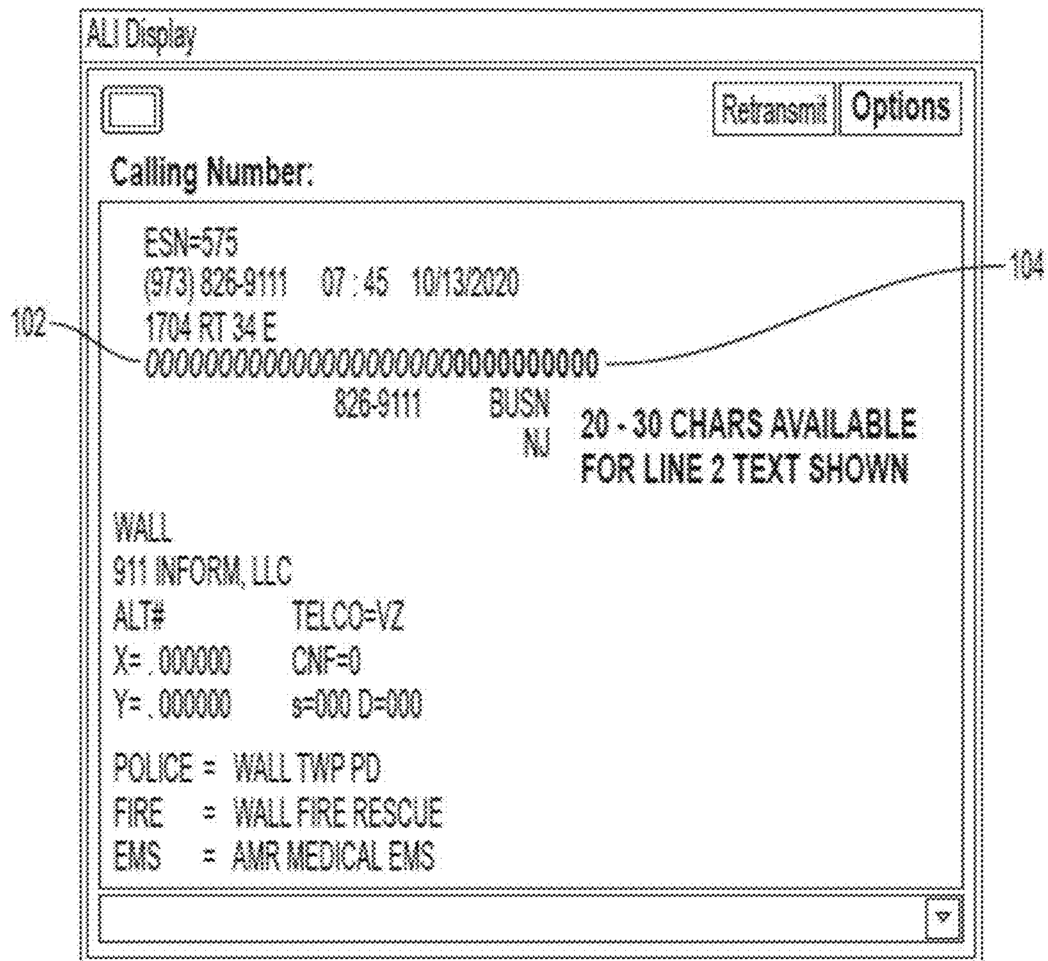
FIG. 1 is an example of a data screen provided by conventional emergency call processing.

An illustrative embodiment of the present invention relates to a technological solution to the problem of inefficient emergency response systems by providing a system and method for providing lockdown capabilities in support of geospatial physical location information for emergency services calls. The system and method identify and store information detailing lockdown features associated with various location sites. Upon receiving a request for geospatial physical location data for an emergency caller during an active emergency call, the server compares the geospatial physical location of the caller with that of the location sites. If the caller's location overlaps with a site having lockdown capabilities, the system generates a notification describing the lockdown features of the relevant location site to the caller. This innovative system enhances emergency response efforts by providing critical information to individuals in need during emergency situations.

FIG. 2 through FIG. 9 wherein like parts are designated by like reference numerals throughout, illustrate an example embodiment or embodiments of the system and a methodology, according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed, such as the size, shape, configuration, or type of elements or materials, in a manner still in keeping with the spirit and scope of the present invention.

Figure 2:
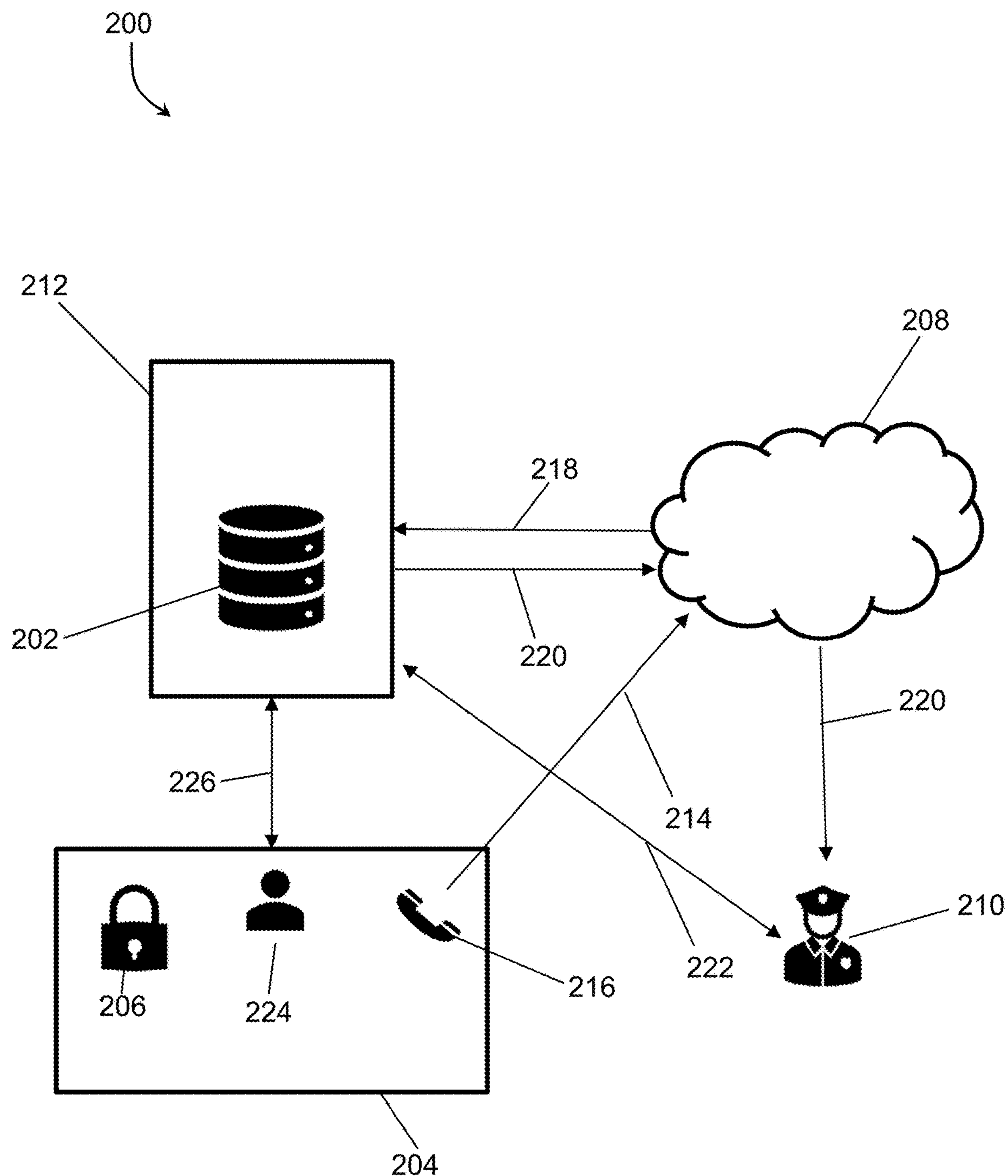
FIG. 2 is an example system for providing lockdown capabilities for a location in support of emergency call processing in accordance with embodiments of the present invention.

FIG. 2 depicts an example system 200 for implementing the present invention. The system 200 makes use of a location database 202 that stores enhanced geospatial physical location data associated with sites 204 including lockdown protocols or capabilities 206 at a site 204 location. The system 200 also includes an emergency call routing service 208 in communication with the database 202 that receives incoming emergency calls and provides the enhanced geospatial physical location data (including lockdown capabilities) from the database 202 to an appropriate emergency responder 210.

In this embodiment, the location database 202 is provided by an enhanced location service provider 212 in communication with the emergency call routing service 208. This service provider 212 can be a server located remotely or be cloud-based. In this embodiment, the one or more client sites 204 are registered with the location service provider 212. The client site 204 may be a building, campus, grounds, or facility.

When the emergency call routing service 208 receives an emergency call 214 from a caller 216, a determination of the geospatial physical location of the caller 216 is made. As part of that process, the emergency call routing service 208 can request 218 enhanced geospatial physical location data from the enhanced location service provider 212. The location service provider 212, in turn, provides enhanced location data 220 in response to the request 218. If or when the geospatial physical location of the caller 216 is determined to fall within a site 204 registered with the enhanced location service provider 212 lockdown capabilities 206 for the site 204 can be provided to the appropriate emergency responder 210 in communication with enhanced location service provider 212 via an application or dedicated console for communicating with the enhanced location service provider 212 in addition to enhanced geospatial location data 220.

The emergency call routing service 210 may be any entity or organization that receives and processes emergency calls, such as 911 calls. The emergency responder may be police, fire, medical, private security, or any other entity or organization that would respond be notified of or respond to an emergency call, such as a 911 call.

Figure 3:
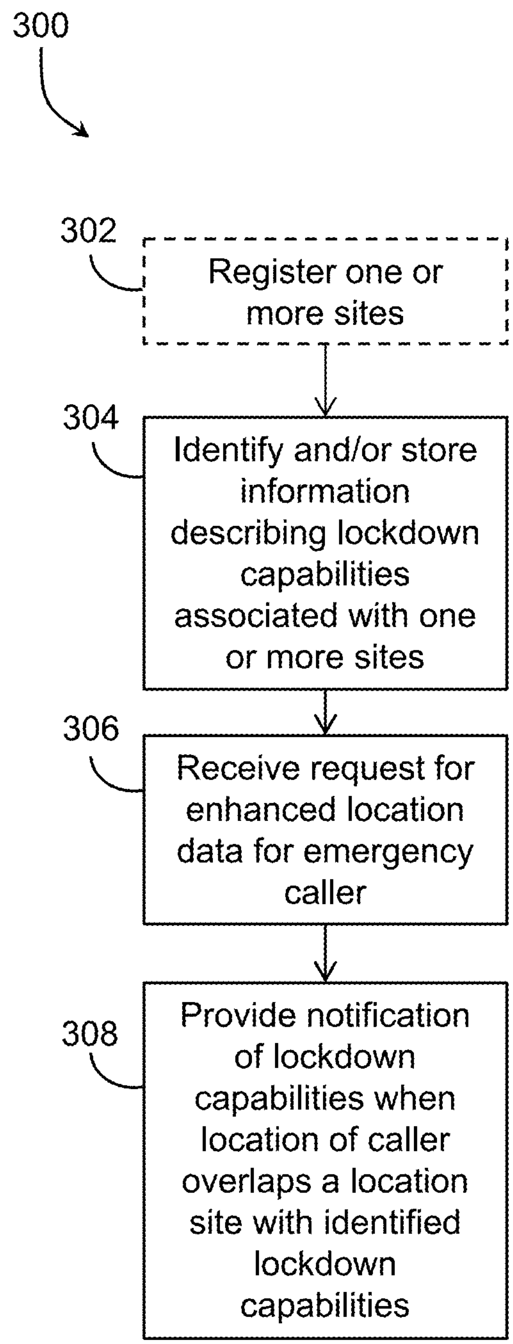
FIG. 3 is an example method for providing lockdown capabilities for a location in support of emergency call processing in accordance with embodiments of the present invention.

An example of how the components of FIG. 2 interact can be seen in FIG. 3 FIG. 3 is a high-level methodology 300 for providing enhanced geospatial physical location data for emergency calls including lockdown capabilities at the site 204.

Figure 7:
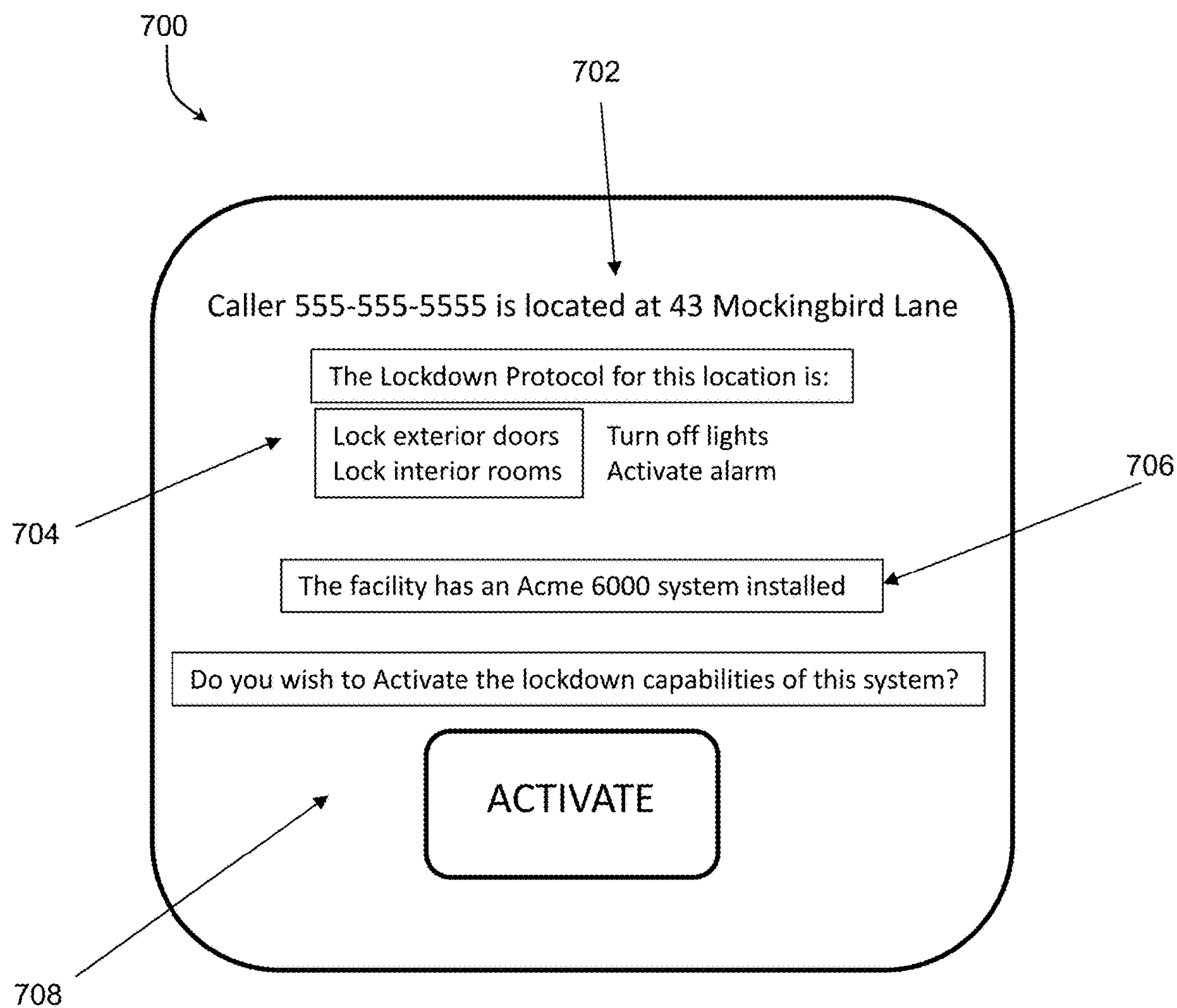
FIG. 7 is an example screenshot of a notification be provided as part of enhanced geospatial location data in accordance with embodiments of the present invention.

Referring now to the method 300 of FIG. 3, In certain embodiments, one or more sites 204 are registered with the enhanced location service provider 212 (Step 302). Then information describing lockdown capabilities 206 associated with one or more location sites 204 are identified and/or stored (Step 304). The method then proceeds when a request 218 for enhanced geospatial physical location data for an emergency call from a caller 216 is received (Step 306). The enhanced geospatial physical location data 220 stored in the maintained database 202 associated with the caller 216 is then output in response to the request (Step 308). As part of this, during the emergency call 214, the geospatial physical location data for the emergency caller 216 is compared to a geospatial physical location of the one or more location sites 204 and when the geospatial physical location of the emergency caller 216 positionally overlaps with the geospatial physical location of one of the one or more locations sites 204 having identified, stored or otherwise established lockdown capabilities 206, a notification 700 (as shown in FIG. 7) that describes the lockdown capabilities 206 of the one of the one or more location sites 204 is provided to the emergency responder 210 either dynamically or in response to a query via direct communication 222.

The enhanced geospatial physical location data 220 can include one or more of a country indication, a state indication, a street address, a floor designation, a room designation. In certain embodiments, an elevation or altitude can be provided, where a positive altitude is above sea level and a negative altitude is below sea level. Altitude may be relayed to users of the system by correlating floor or other appropriate indicator. In some certain embodiments, a map or floorplan 500 (as seen in FIG. 5) can further be provided to the emergency responder 210.

Notification 700 of lockdown capabilities 206 can be provided when the caller 216 is identified as being located at a site 204 registered with the enhanced location service provider 212. In registering a site 204, a user, such as an administrator 224, for example, a site 204 owner or manager, provides information regarding the site 204 for the database 202, such as name, location, etc. as well as the lockdown capabilities 206.

Figure 4:
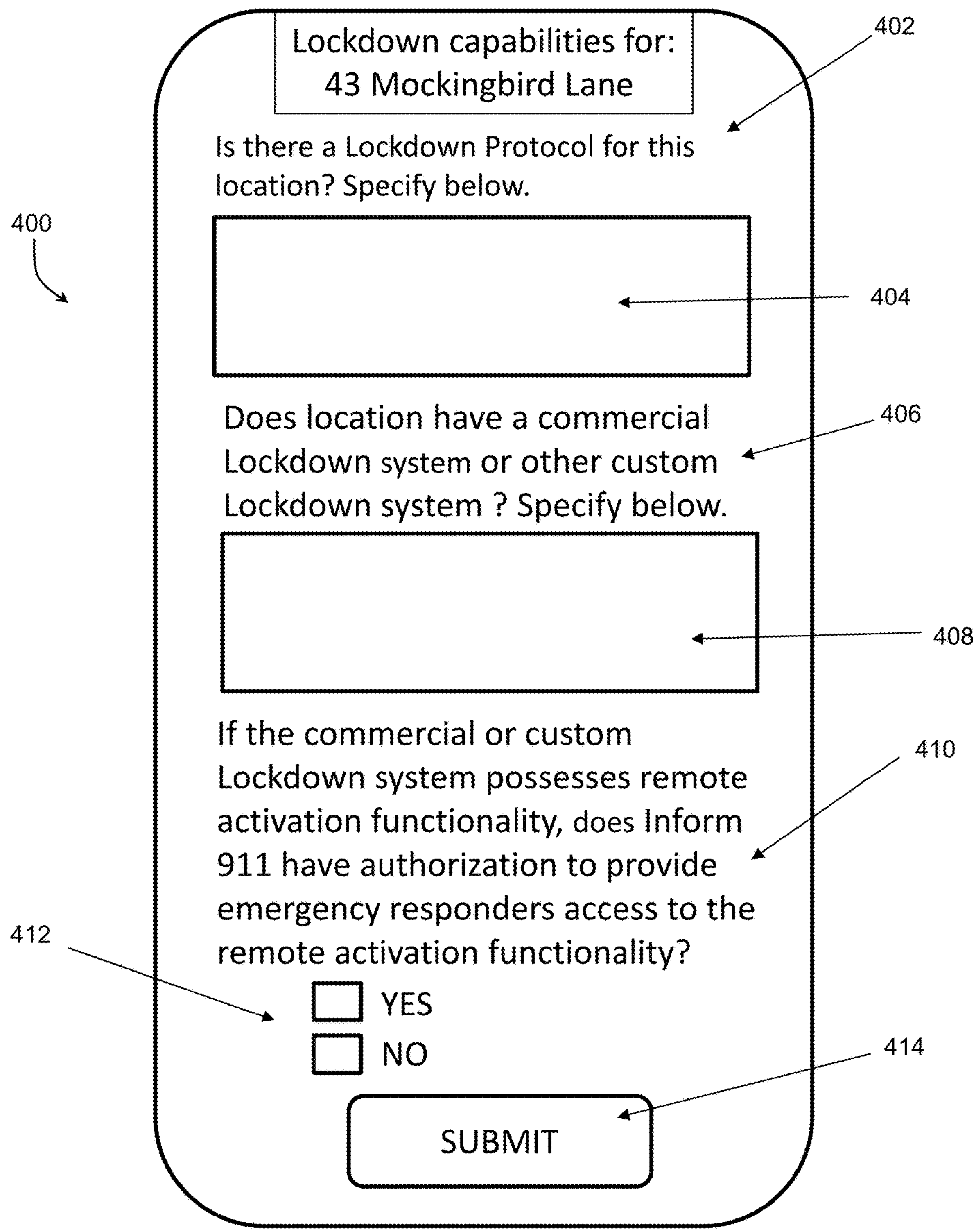
FIG. 4 is an example of a form used to identify and/or store lockdown capabilities for the location site when the site location is registered with the enhanced location service provider in accordance with embodiments of the present invention.

FIG. 4 depicts an example questionnaire or input form 400 provided to a user such as the administrator 224 (or their organization with which they are in some way associated, or the manager of the site 204) for inputting the lockdown capabilities for the location site 204. Here the input form 400 asked the administrator 224 if the location site 204 has a lockdown protocol 402 and provides an area where the administrator 224 or other user can input a response 404. The lockdown protocols may be a list of procedures or protocols established for the location site 204 that set forth the actions and/or behaviors to be undertaken in case of a lockdown. The form 400 also asked if the location site has a commercially installed lockdown system or a custom lockdown system 406 and provides an area where the administrator 224 or other user can input a response 408. The form 400 then asks if remote activation is available, could the enhanced location service provider 212 provide emergency responders 210 with the remote access 410, and allows the administrator 224 or other user to check a corresponding box 412 in response. At the bottom of the form 400 a button 414 is provided to submit and save the user's responses. It should be noted that the text and icons presented in FIG. 4 are merely illustrative of one way of identifying and/or saving information describing lockdown capabilities for a location site 204. The actual format and text can vary, thus the specific form displayed in the screenshots is not directly relevant to the understanding of the invention. Other ways of identifying and/or saving information describing lockdown capabilities for a location site 204 (Step 304) will be apparent to one skilled in the art given the benefit of this disclosure.

Figure 5:
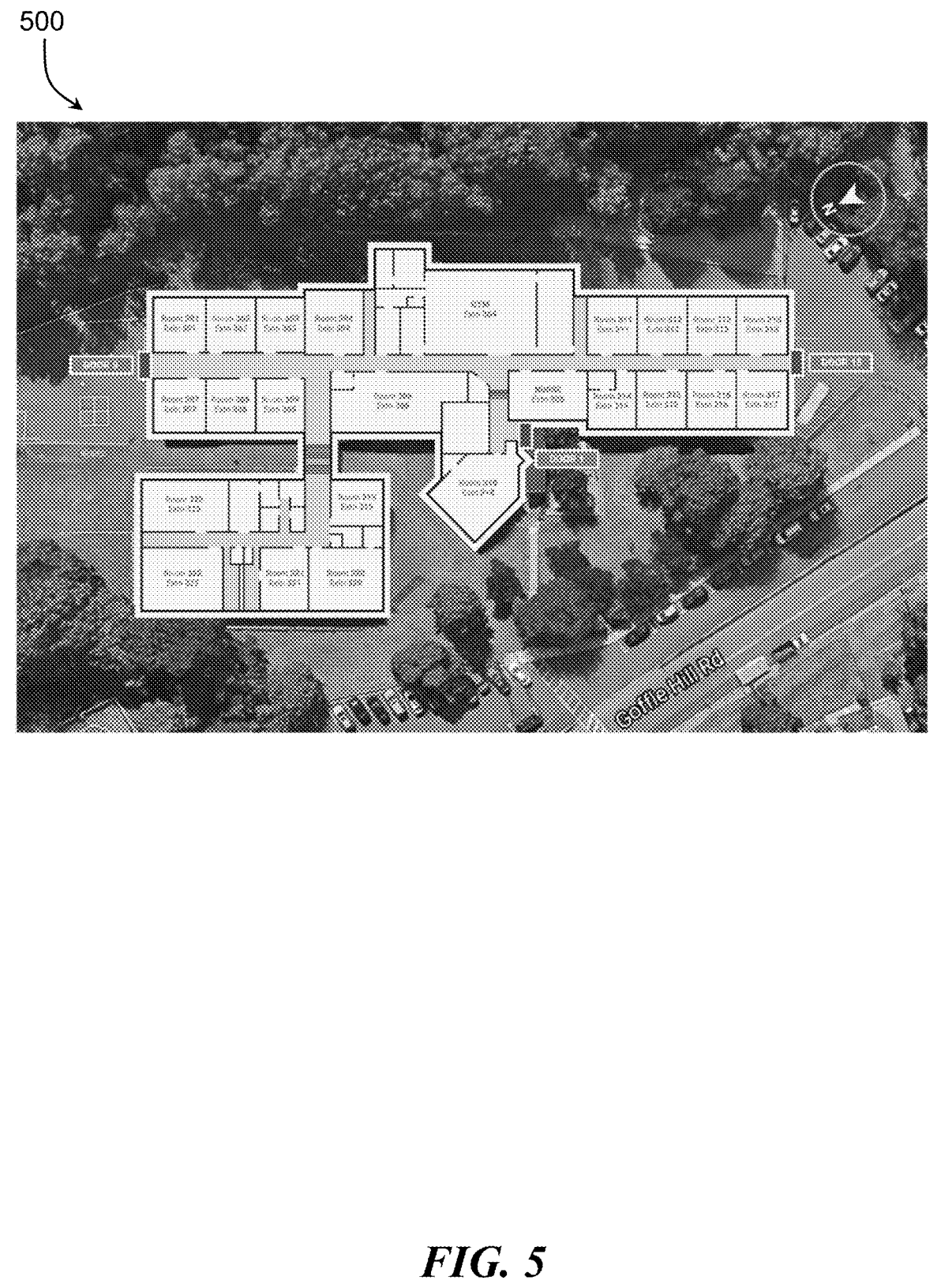

In other embodiments, the administrator 224 (or their organization with which they are in some way associated, or the manager of the site 204) may submit a map or floorplan, such as seen in FIG. 5. In still other embodiments, the enhanced location service provider 212 generates or otherwise obtains a map based on the information provided by the administrator 224. The interaction 226 between the enhanced location service provider 212 and the administrator 224 can be performed using a browser, website, interface, or application operating on a personal computing device of the administrator 224 or other user.

It should be noted that the text and icons presented in the floorplan 500 of FIG. 5 are merely illustrative of what can be displayed. The actual format and text can vary, thus the specific characters displayed in the screenshots are not directly relevant to the understanding of the invention. The enhanced geospatial physical location data 220 can also include points of entrance or egress (doors/windows/fire escapes), fire/emergency resources, entry routes, escape routes, etc. If there is lockdown capabilities 206 for the site 204, a notification 700 of the lockdown capabilities 206 is also provided along with the enhanced geospatial physical location data 220.

If there are specific remotely activatable lockdown capabilities 206 at the site 204, the administrator 224 or other user is also provided with the ability to indicate their availability. The administrator 224 or other user can specify the exits or internal doors that can be locked or unlocked, alarms that can be activated, lights that can be turned off and on, and cameras having remote access capabilities. In such instances, the administrator 224 or other user can also specify the means for activating the lockdown capabilities 206, for example, a code, address, or interface for activating one or more of the lockdown capabilities 206. One way of performing this can be seen in FIG. 6. Here an example screenshot is depicted. It should be noted that the text and icons presented in this floorplan are merely illustrative of what can be displayed. The actual format and text can vary, thus the specific characters displayed in the screenshots are not directly relevant to the understanding of the invention.

Figure 6:
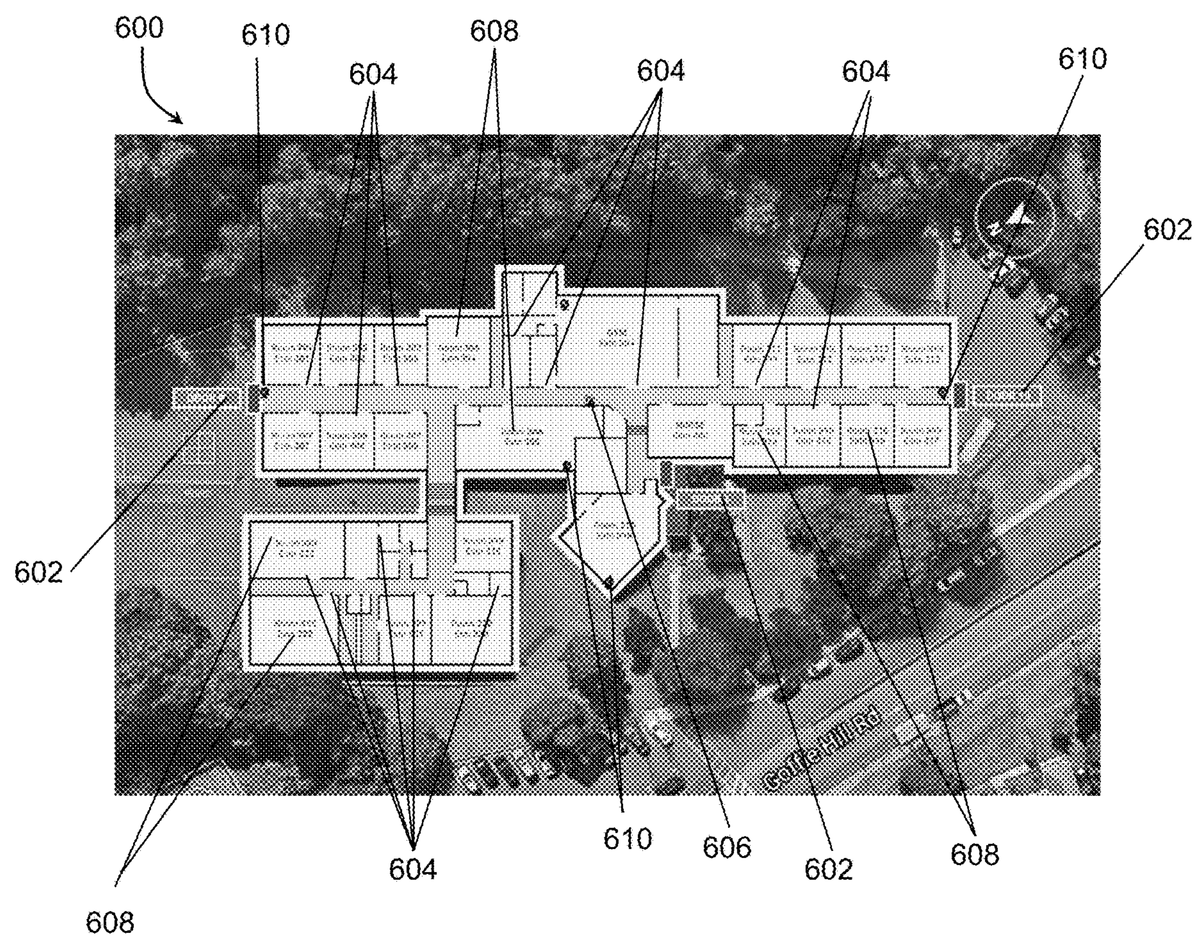
FIG. 6 is an example screenshot for identifying and storing information describing lockdown capabilities at a location site in accordance with embodiments of the present invention.

In FIG. 6 an interactive version 600 of the floorplan 500 of FIG. 5 is provided to the administrator 224 or other user registering the site 204. Using the interactive version 600, the administrator 224 can select, flag, or otherwise indicate exits 602 or internal doors 604 that can be locked or unlocked, alarms 606 that can be activated, room for which lights 608 can be turned off or on in, and cameras 610 having remote access capabilities. This can be done by providing the code, address, or interface for activating one or more of the exits, internal doors, alarms, and cameras. This process can then be repeated as necessary for each site 204 being registered.

With the one or more sites 204 registered (Step 302) and lockdown capabilities 206 identified and stored (Step 304), when a request 218 for enhanced geospatial physical location data is received by the enhanced location service provider 212 (Step 306) from an emergency call routing service 208 for a caller 216, if the geospatial physical location of the caller 216 positionally overlaps the geospatial physical location of one or more location sites 204 having identified and/or stored lockdown capabilities 206, then the lockdown capabilities 206 are provided along with the other enhanced location data 220 for the caller 216 (Step 308). One example of this can be seen in FIG. 7. Here an example screenshot of a notification 700 is depicted that is provided with the enhanced geospatial physical location data outputted 220 by the enhanced location service provider 212 or provided to the first responder 210 for a site 204 dynamically or in response to a query via direct communication 222. It should be noted that the text and icons presented in this notification are merely illustrative of what can be displayed. The actual format and text can vary, thus the specific characters displayed in the screenshots are not directly relevant to the understanding of the invention.

In FIG. 7, the notification 700 includes a location 702 for the emergency caller 216 as well as the lockdown capabilities 206 for the location site 204 where the emergency caller 216 is located. Here the lockdown capabilities include the lockdown protocol 704 for the location site 204, the type of lockdown system 706 for the location site 204, and remote activation capabilities 708 for the lockdown system provided as an icon or link.

Figure 8:
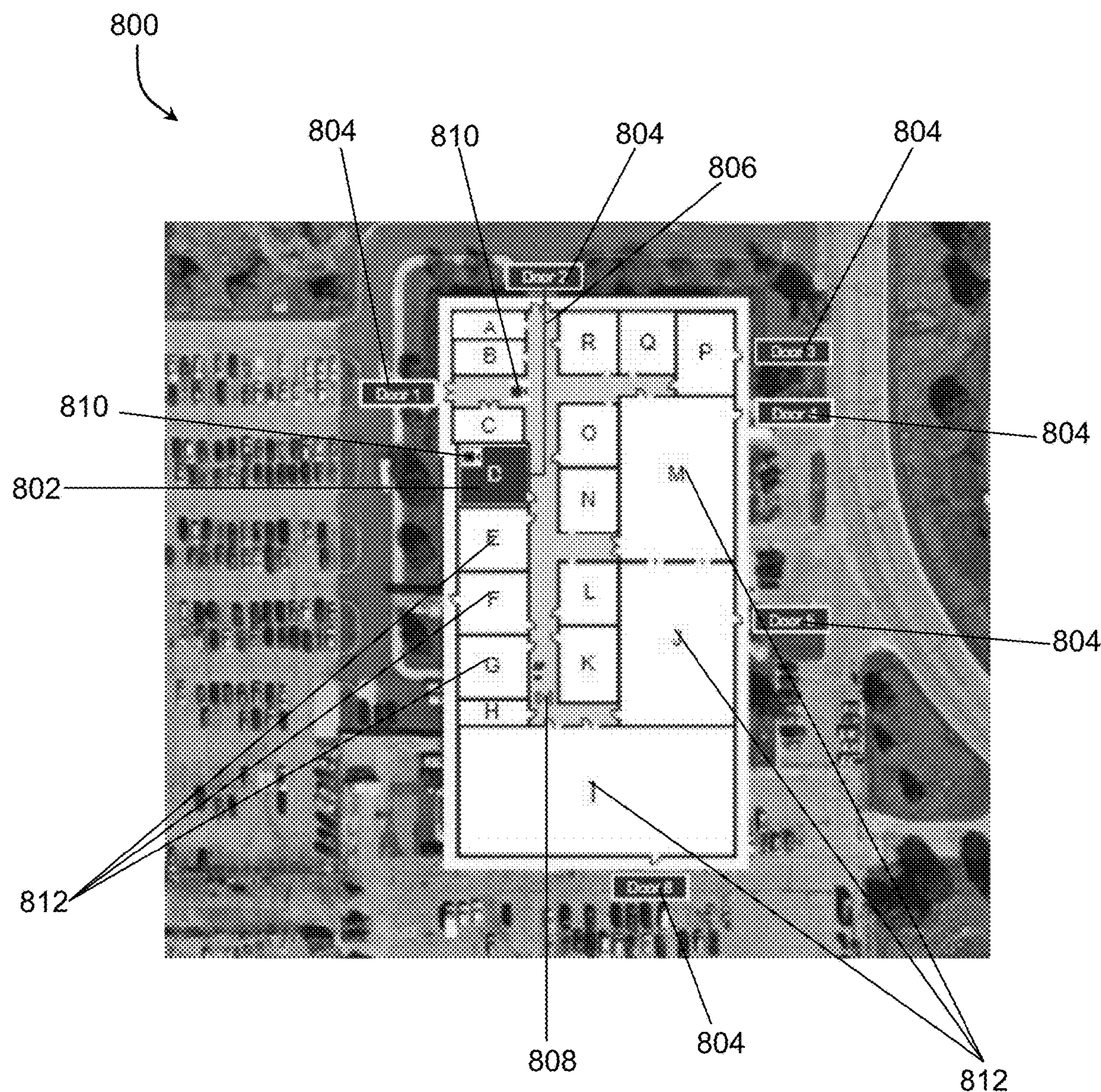
FIG. 8 is an example screenshot of enhanced geospatial location data including lockdown capabilities that can be provided in accordance with embodiments of the present invention.

FIG. 8 depicts another example of enhanced geospatial physical location data outputted 220 by the enhanced location service provider 212 to the first responder 210 for a site 204 via direct communication 222. Here the enhanced geospatial physical location data further comprises an interactive map, in this case, a floorplan 800. In this embodiment, the floorplan 800 includes the geospatial physical location of the caller 216 (802), an indication of access points to the facility that can be locked or unlocked (Doors 804), access/egress for the caller 216 (806), alarms 808 that may be activated, cameras 810 that can be accessed, and rooms for which doors can be locked or unlocked and lights turned off and on by selecting the associated letter designation of the room 812.

In certain embodiments, the location service provider 212 can provide additional functionality. For example, the location service provider can send a notification to an administrator 224 or security personnel at the geospatial physical location of the emergency call.

Figure 9:
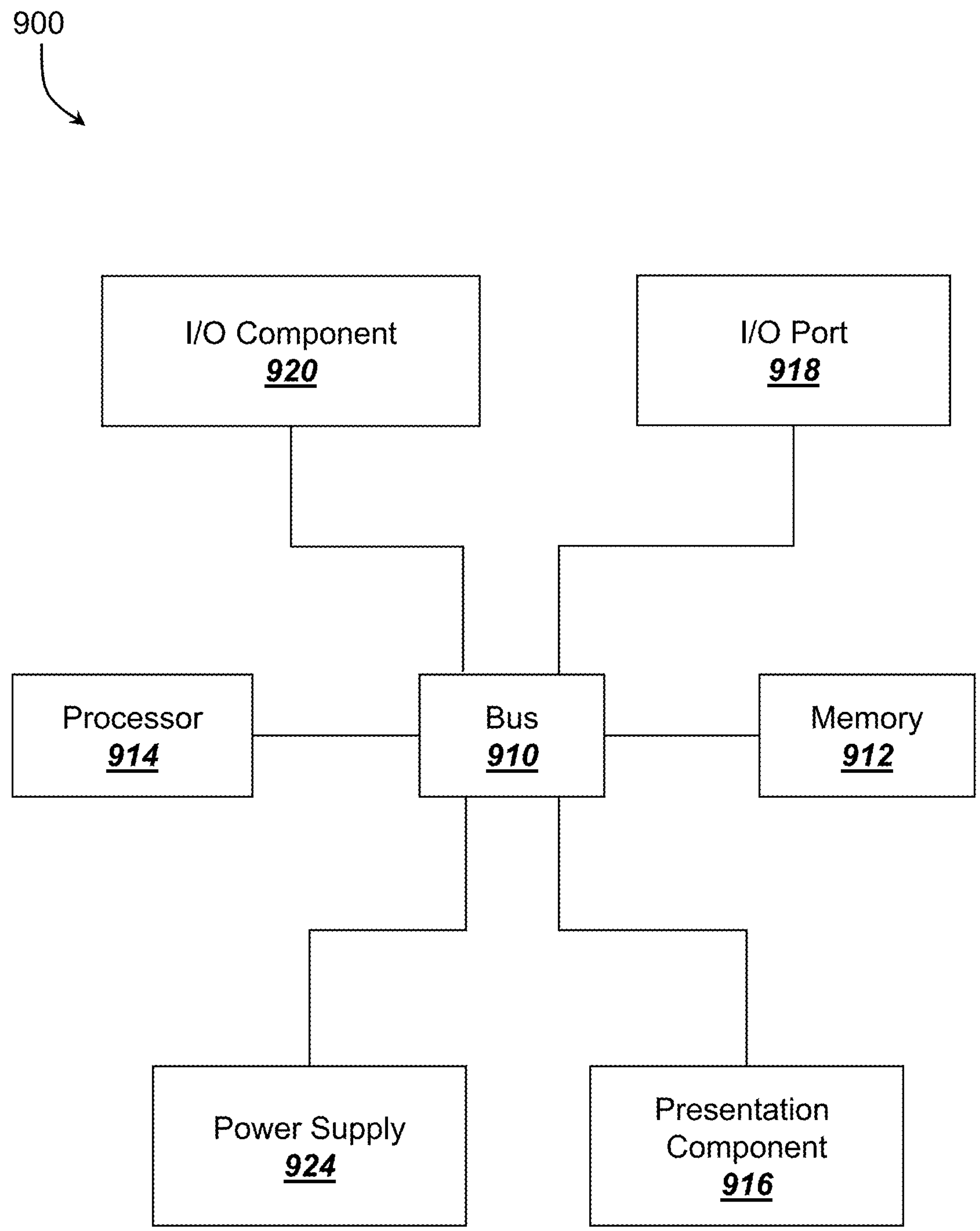
FIG. 9 is a diagrammatic illustration of a high-level architecture configured for implementing processes in accordance with aspects of the invention.

One illustrative example of a computing device 900 used to provide the functionality of the present invention, such as provided by the location database 202, location service provider 212, or a personal computing device of an administrator 224 or emergency responder 210. The computing device 900 is merely an illustrative example of a suitable special-purpose computing environment and in no way limits the scope of the present invention. A "computing device," as represented by FIG. 9, can include a "workstation," a "server," a "laptop," a "desktop," a "hand-held device," a "mobile device," a "tablet computer," or other computing devices, as would be understood by those of skill in the art. Given that the computing device 900 is depicted for illustrative purposes, embodiments of the present invention may utilize any number of computing devices 900 in any number of different ways to implement a single embodiment of the present invention. Accordingly, embodiments of the present invention are not limited to a single computing device 900, as would be appreciated by one with skill in the art, nor are they limited to a single type of implementation or configuration of the example computing device 900.

The computing device 900 can include a bus 910 that can be coupled to one or more of the following illustrative components, directly or indirectly: a memory 912, one or more processors 914, one or more presentation components 916, input/output ports 918, input/output components 920, and a power supply 924. One of skill in the art will appreciate that the bus 910 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices. As such, FIG. 9 is merely illustrative of an exemplary computing device that can be used to implement one or more embodiments of the present invention, and in no way limits the invention.

The computing device 900 can include or interact with a variety of computer-readable media. For example, computer-readable media can include Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices that can be used to encode information and can be accessed by the computing device 900.

The memory 912 can include computer-storage media in the form of volatile and/or nonvolatile memory. The memory 912 may be removable, non-removable, or any combination thereof. Exemplary hardware devices are devices such as hard drives, solid-state memory, optical-disc drives, and the like. The computing device 900 can include one or more processors 914 that read data from components such as the memory 912, the various I/O components 916, etc. Presentation component(s) 916 present data indications to a user or other device. Exemplary presentation components include a display device, speaker, printing component, vibrating component, etc.

The I/O ports 918 can enable the computing device 900 to be logically coupled to other devices, such as I/O components 920. Some of the I/O components 920 can be built into the computing device 900. Examples of such I/O components 920 include a camera 9 microphones, joystick, recording device, game pad, satellite dish, scanner, printer, wireless device, networking device, and the like.

The power supply 924 can include batteries. Other suitable power supply or batteries will be apparent to one skilled in the art given the benefit of this disclosure.

The disclosed embodiments of the present invention provide lockdown capabilities in support of geospatial physical location data for emergency services calls. The system and method identify and store information detailing lockdown features associated with various location sites. Upon receiving a request for geospatial physical location data for an emergency caller during an active emergency call, the server compares the geospatial physical location of the caller with that of the location sites. If the caller's location overlaps with a site having lockdown capabilities, the system generates a notification describing the lockdown features of the relevant location site to the caller. Thus, the system provides enhanced geospatial physical location functionality as the geospatial physical location data lockdown capabilities are more robust and readily available than what was previously provided in conjunction with emergency calls. The present invention provides the technology enabling a practical solution of providing first responders any other emergency workers with substantially more accurate geospatial location information pinpointing the exact origins of an emergency caller, and additionally provides the technology for lockdown capabilities corresponding to the geofenced location that is also the origin of the emergency call. With the technology of the present invention, the first responders and other emergency workers are transformed from having a general building address of an emergency caller, to a specific room or other enhanced geospatial location along with lockdown capabilities. Prior technology of emergency call handling was incapable of providing this functionality. The enhanced geospatial location data provided by the present invention saves the first responder time and prevents unnecessary danger as the first responder does not have to separately obtain the floor plan and determine the lockdown capabilities at the site or proceed without the additional information and enter a potentially dangerous situation or environment blind.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may exist in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extent or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A system for providing lockdown capabilities in support of emergency call location data, the system comprising:

a server configured to:

identify and store information describing lockdown capabilities associated with one or more location sites;

receive a request for geospatial physical location data for an emergency caller from an emergency call routing service based on an active emergency call; and during the emergency call:

compare a geospatial physical location of the one or more location sites with the geospatial physical location data for the emergency caller; and when the geospatial physical location of the emergency caller positionally overlaps with the geospatial physical location of one of the one or more locations sites having identified and/or stored lockdown capabilities, provide an emergency responder at the one of the one or more location sites a notification that describes the lockdown capabilities of the one of the one or more location sites along with the geospatial physical location data of the caller.

2. The system of claim 1, wherein the provided lockdown capabilities include lockdown protocols for the one or more location sites.

3. The system of claim 1, where the provided lockdown capabilities include remote activation for lockdown at the location of the caller.

4. The system of claim 1, wherein the one or more location sites comprise a building or grounds.

5. The system of claim 1, wherein providing the geospatial physical location of the caller further includes providing a map of the geospatial physical location.

6. The system of claim 5, wherein the lockdown capabilities are provided as selectable icons or links on the map.

7. The system of claim 1, wherein providing the geospatial physical location of the caller further comprises providing an altitude of the caller.

8. The system of claim 1, wherein providing the geospatial physical location of the caller further comprises providing a room within a building or facility the caller is located.

9. The system of claim 1, wherein the server is further configured to:

register one or more geospatial physical location sites.

10. The system of claim 1, wherein the server is further configured to provide a notification that describes the lockdown capabilities of the one of the one or more location sites along with the geospatial physical location data of the caller to an administrator.

11. The system of claim 1, wherein the notification is provided in response to a query from the emergency responder.

12. A system for providing lockdown capabilities in support of emergency call location data, the system comprising:

an emergency call routing service configured to receive, process, and route emergency call; and an enhanced geospatial physical location service provider in communication with the emergency call routing service; the enhanced geospatial physical location service provider configured to:

identify and store information describing lockdown capabilities associated with one or more location sites;

receive a request for geospatial physical location data for an emergency caller based on an active emergency call; and during the emergency call:

compare a geospatial physical location of the one or more location sites with the geospatial physical location data for the emergency caller; and when the geospatial physical location of the emergency caller positionally overlaps with the geospatial physical location of one of the one or more locations sites having identified and/or stored lockdown capabilities, provide an emergency responder at the one of the one or more location sites a notification that describes the lockdown capabilities of one of the one or more location sites along with the geospatial physical location data of the caller.

13. A method for providing lockdown capabilities in support of emergency call location data, the method comprising:

identifying and/or storing information describing lockdown capabilities associated with one or more location sites;

receiving a request for geospatial physical location data for an emergency caller based on an active emergency call; and during the emergency call:

comparing a geospatial physical location of the one or more location sites with the geospatial physical location data for the emergency caller; and when the geospatial physical location of the emergency caller positionally overlaps with the geospatial physical location of one of the one or more locations sites having identified and stored lockdown capabilities, providing an emergency responder at the one of the one or more location sites a notification that describes the lockdown capabilities of the one of the one or more location sites along with the geospatial physical location of the caller.

14. The method of claim 13, wherein the provided lockdown capabilities include lockdown protocols for the one or more location sites.

15. The method of claim 13, where the provided lockdown capabilities include remote activation for lockdown at the location of the caller.

16. The method of claim 13, wherein the one or more location sites comprise a building or grounds.

17. The method of claim 13, wherein providing the geospatial physical location of the caller further includes providing a map of the geospatial physical location.

18. The method of claim 17, wherein the lockdown capabilities are provided as selectable icons or links on the map.

19. The method of claim 13, wherein providing the geospatial physical location of the caller further comprises providing an altitude of the caller.

20. The method of claim 13, wherein the providing the geospatial physical location of the caller further comprises providing a room within a building or facility the caller is located.

21. The method of claim 13, further comprising:

registering one or more geospatial physical location sites.

22. The method of claim 13, further comprising providing a notification that describes the lockdown capabilities of the one of the one or more location sites along with the geospatial physical location data of the caller to an administrator.

23. The method of claim 13, wherein the notification is provided in response to a query from the emergency responder.

* * * * *